United States Patent
Fan et al.

(10) Patent No.: US 9,256,078 B2
(45) Date of Patent: Feb. 9, 2016

(54) 3D DISPLAY APPARATUS AND PIXEL ARRAY STRUCTURE THEREOF

(71) Applicant: SHENZHEN CHINA STAR OPTOELECTRONICS TECHNOLOGY CO., LTD, Shenzhen (CN)

(72) Inventors: Deyong Fan, Shenzhen (CN); Chihming Yang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 49 days.

(21) Appl. No.: 14/131,909

(22) PCT Filed: Dec. 19, 2013

(86) PCT No.: PCT/CN2013/089925
§ 371 (c)(1),
(2) Date: Jan. 10, 2014

(87) PCT Pub. No.: WO2015/085619
PCT Pub. Date: Jun. 18, 2015

(65) Prior Publication Data
US 2015/0168735 A1    Jun. 18, 2015

(30) Foreign Application Priority Data

Dec. 13, 2013   (CN) .......................... 2013 1 0686723

(51) Int. Cl.
- *G02F 1/1335* (2006.01)
- *G02B 27/26* (2006.01)
- *H04N 13/04* (2006.01)
- *G02F 1/13363* (2006.01)

(52) U.S. Cl.
CPC .... *G02B 27/26* (2013.01); *G02F 2001/133631* (2013.01); *H04N 13/0434* (2013.01)

(58) Field of Classification Search
CPC .......... H04N 13/0409; H04N 13/0029; H04N 13/0059; H04N 13/0429; H04N 13/0468; H04N 13/0452; H04N 13/047; H04N 13/0477; H04N 13/00; H04N 13/0003; H04N 13/0018; H04N 13/0022; H04N 13/004; H04N 2013/0465; H04N 2013/0085; H04N 1/00129; H04N 5/57; H04N 2213/006; G06T 15/00; G06T 15/50; G06T 2207/10012; G06T 2207/10024; G06T 7/0075; G09G 2300/0426; G09G 2300/0439; G09G 2300/0443; G09G 3/003; G09G 3/3406; G09G 3/3413; G09G 3/3648; G09G 2320/0233; G09G 2320/028; G09G 2320/0295; G09G 2320/0209; G09G 2320/0626; G09G 2320/0666; G09G 2320/0686; G09G 2360/148; G09G 2340/0464; G09G 2340/10; G02B 2027/0118; G02B 27/22; G01S 7/52071; G02F 1/133512; G02F 1/136209; G02F 1/133504; G02F 1/133514; G02F 1/133528; G02F 2001/134345; G02F 2201/123; G02F 2201/40; G02F 1/1335
USPC ......... 345/419, 690, 92, 77, 589, 88, 170, 89, 345/6, 698; 382/154, 274, 167, 260; 348/687, 353, 42, 51, 564, E13.001, 348/E13.026, E5.119, 53; 349/15, 106, 349/117; 359/462, 466
See application file for complete search history.

(56) References Cited

U.S. PATENT DOCUMENTS

| | | | |
|---|---|---|---|
| 6,046,787 A * | 4/2000 | Nishiguchi .................. | 349/129 |
| 2010/0103339 A1* | 4/2010 | Shimoshikiryoh et al. ..... | 349/39 |
| 2013/0250198 A1 | 9/2013 | Shimoshikiryoh et al. | |
| 2013/0335540 A1 | 12/2013 | Hsiao et al. | |

FOREIGN PATENT DOCUMENTS

| | | |
|---|---|---|
| CN | 101636690 A | 1/2010 |
| CN | 102768437 A | 11/2012 |
| CN | 203085537 U | 7/2013 |

* cited by examiner

*Primary Examiner* — Thoi Duong
(74) *Attorney, Agent, or Firm* — Mark M. Friedman

(57) ABSTRACT

A 3D display apparatus and a pixel array structure thereof are disclosed. The pixel array structure has a plurality of pixel rows. Each pixel row has a plurality of sub-pixels. Each sub-pixel has a first minor section, a second minor section and a major section. The major section is disposed between the first minor section and the second minor section. The brightness of the first minor section and the second minor section is lower than that of the major section. The 3D display apparatus can maintain the same display quality at top and bottom view angles.

10 Claims, 5 Drawing Sheets

3D DISPLAY APPARATUS AND PIXEL ARRAY STRUCTURE THEREOF

BACKGROUND OF THE INVENTION

1. Field of the Invention

The present invention relates to the field of display technology, and more particularly to a 3D display apparatus and a pixel array structure thereof.

2. Description of the Related Art

Since there is a distance between the eyes of a person, the eyes each see an object from different directions. Accordingly, a 3D display device provides different images to a person's eyes, respectively, based on binocular disparity, so as to perform a stereoscopic effect.

With reference to FIG. 1, in a conventional 3D display system, lights projected from a liquid crystal display panel of the 3D display system first travel through a polarizer 90 and then turn into linearly polarized lights. The linearly polarized lights then travel through a λ/4 patterned retarder plate 91. The λ/4 patterned retarder plate 91 with multiple first phase retarder portions 910 and multiple second phase retarder portions 911 can convert the linearly polarized lights into left-handed circularly polarized lights and right-handed circularly polarized lights so that the left-handed circularly polarized lights and right-handed circularly polarized lights can be used as input images for left eye and input images for right eye, respectively. The lenses of polarized glasses 8 worn by an observer each are composed of a quarter-wave plate 80 and a polarizer 81. The lights including the left-handed circularly polarized lights and right-handed circularly polarized lights first travel through the quarter-wave plates 80 of the lenses to be converted into linearly polarized lights. The linearly polarized lights then travel through the polarizers 81 of the lenses and enter the left eye and right eye of the observer. Since the polarizers 81 of the lenses each have different polarization directions, the observer can only see the input images for left eye with his left eye, and see the input images for right eye with his right eye, thereby creating stereoscopic imaging in his brain to achieve a 3D effect.

The liquid crystal display panel used in a conventional 3D display apparatus generally has a so-called "color wash-out" problem, which means when a user watch the 3D display apparatus at different viewing angles, the user will see that the same image having different color tones.

With reference to FIG. 2, the liquid crystal display panel used in a conventional 3D display apparatus has a pixel array formed by a plurality of pixel rows 7. Each of the pixel rows 7 has a plurality of sub-pixels arranged side by side, wherein each of the pixel rows 7 corresponds to the position of one of the phase retarder portions (910 or 911) of the retarder plate 91. In order to improve the color wash-out problem, each sub-pixel 70 of the liquid crystal display device is cut into two sections—a major section 70 and a minor section 72. When the major section 71 and the minor section 72 of the sub-pixel 70 are applied to with different voltages, the liquid crystal molecules in the liquid crystal display panel can be arranged in multi-domain to improve color wash-out.

For the above-mentioned 3D display apparatus, when a user watches the display at a bottom view angle or a top view angle, such as shown in FIG. 3, it is inevitable to see the light leakage from other pixel rows at the junction between the first phase retarder portion 910 and the second phase retarder portion 910 of the phase retarder film 91, that is to say, the user will receive two pixel row of images at the same phase retarder portion. An obvious shortcoming of the foregoing pixel structure is that when viewing at a bottom view angle, the user will see the light leakage of the major section 71 of the sub-pixel 70 of the adjacent pixel row; and when viewing at a top view angle, the user will see the light leakage of the minor section 72 of the sub-pixel 70 of the adjacent pixel row. Therefore, the user will find out that since the major section 71 and minor section 72 have different brightness, the 3D display qualities at top view angles and at bottom view angles are different.

Hence, it is necessary to provide a new technical solution to overcome the problems existing in the conventional technology.

SUMMARY OF THE INVENTION

In view of the shortcomings of conventional technology, the primary object of the present invention is to provide a 3D display apparatus to solve the problem that there is a discrepancy between 3D display qualities at a bottom viewing angle and at a top viewing angle.

In order to achieve the foregoing object, the present invention provides a 3D display apparatus having a liquid crystal display panel having a pixel array having a plurality of pixel rows arranged side by side, wherein each pixel row includes a plurality of sub-pixels, and each sub-pixel has a first minor section, a second minor section and a major section, wherein the major section is disposed between the first minor section and the second minor section, and the brightness of the first minor section and the second minor section is lower than that of the major section; and a phase retarder film mounted on the liquid crystal display panel and overlapped with the pixel array, and having a plurality of phase retarder units arranged side by side, wherein the positions of the phase retarder units of phase retarder units correspond to the pixel rows, respectively.

In one embodiment of the present invention, the pixel rows are longitudinally arranged side by side; the phase retarder units are longitudinally arranged side by side; the sub-pixels of each of the pixel rows are transversely arranged side by side; the first minor section, the major section and the second minor section of each of the sub-pixels are longitudinally arranged side by side.

In one embodiment of the present invention, a driving voltage applied to the major section is greater than a driving voltage applied to the first minor section and a driving voltage applied to the second minor section.

In one embodiment of the present invention, the driving voltage applied to the first minor section is equal to the driving voltage applied to the second minor section.

In one embodiment of the present invention, a light shielding member is mounted between each two adjacent pixel rows.

In one embodiment of the present invention, the liquid crystal display panel includes a plurality of gate lines, a plurality of data lines, wherein the gate lines cross the data lines, wherein each of the pixel rows is disposed between two adjacent gate lines.

In one embodiment of the present invention, the phase retarder units of the phase retarder film are divided into a plurality of first phase retarder units and a plurality of second phase retarder units, and the first retarder units and the second retarder units are arranged alternately.

In one embodiment of the present invention, the phase retarder film is mounted on a surface of a polarizer at a light-exiting side of the liquid crystal display panel.

The present invention further provides a pixel array structure having a plurality of pixel rows, wherein each pixel row has a plurality of sub-pixels, and each sub-pixel has a first minor section, a second minor section and a major section, wherein the major section is disposed between the first minor section and the second minor section, and the brightness of the first minor section and the second minor section is lower than that of the major section.

The present invention further provides another 3D display apparatus having a liquid crystal display panel having a pixel array having a plurality of pixel rows longitudinally arranged side by side, wherein each pixel row includes a plurality of sub-pixels, and each sub-pixel has at least two minor section and at least one major section longitudinally arranged side by side, wherein the major section is disposed between the at least two minor sections, and the brightness of the minor sections is lower than that of the major section; and a phase retarder film mounted on the liquid crystal display panel and overlapped with the pixel array, and having a plurality of phase retarder units longitudinally arranged and connected, wherein the positions of the phase retarder units of phase retarder units correspond to the pixel rows, respectively.

The present invention is to cut a sub-pixel into at least three sections where the sections at the top and the bottom are minor sections with lower brightness, so that no matter at a top viewing angle or a bottom viewing angle, the user will see a minor section with lower brightness in the adjacent pixel row, thereby maintaining the same 3D display qualities at the top viewing angle and the bottom viewing angle.

DETAILED DESCRIPTION OF THE PREFERRED EMBODIMENTS

The following description of each embodiment is referring to the accompanying drawings so as to illustrate practicable specific embodiments in accordance with the present invention. The directional terms described in the present invention, such as upper, lower, front, rear, left, right, inner, outer, side, etc., are only directions referring to the accompanying drawings, so that the used directional terms are used to describe and understand the present invention, but the present invention is not limited thereto.

Figure 1:
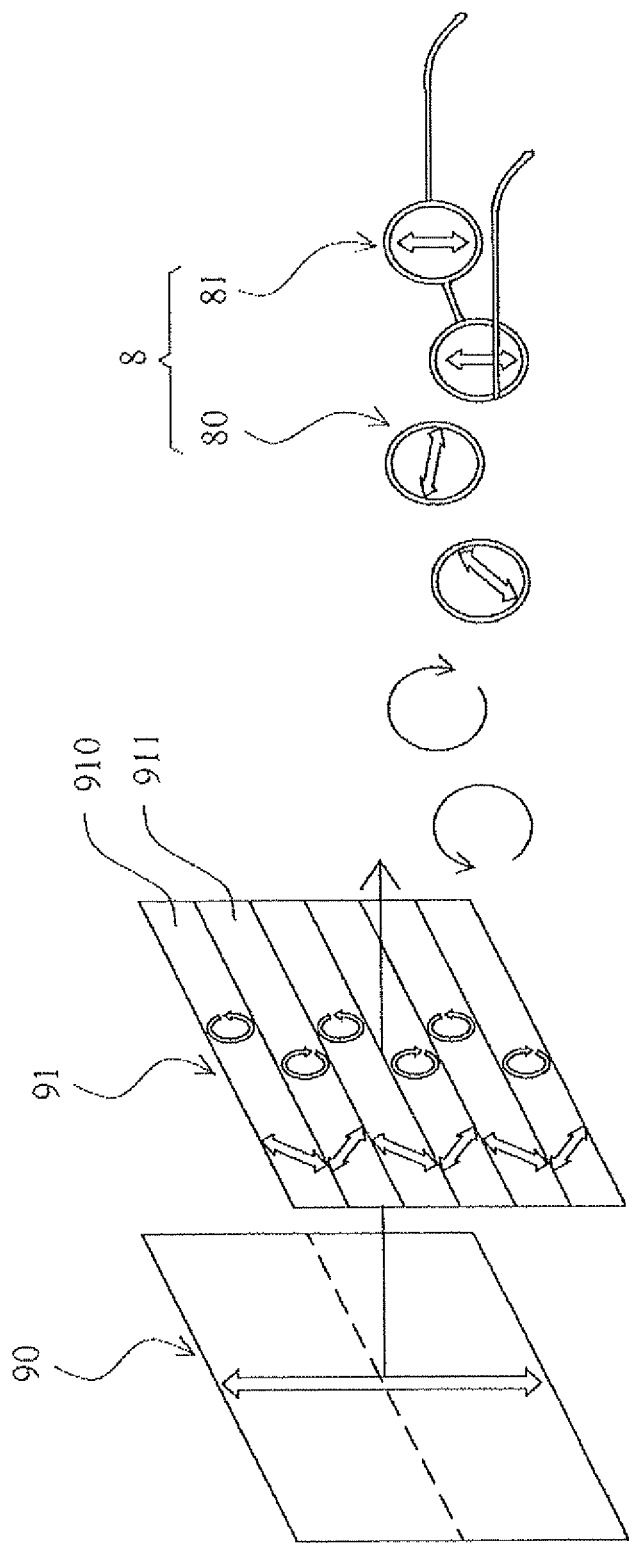
FIG. 1 is a schematic view of a conventional 3D display system.
Figure 2:
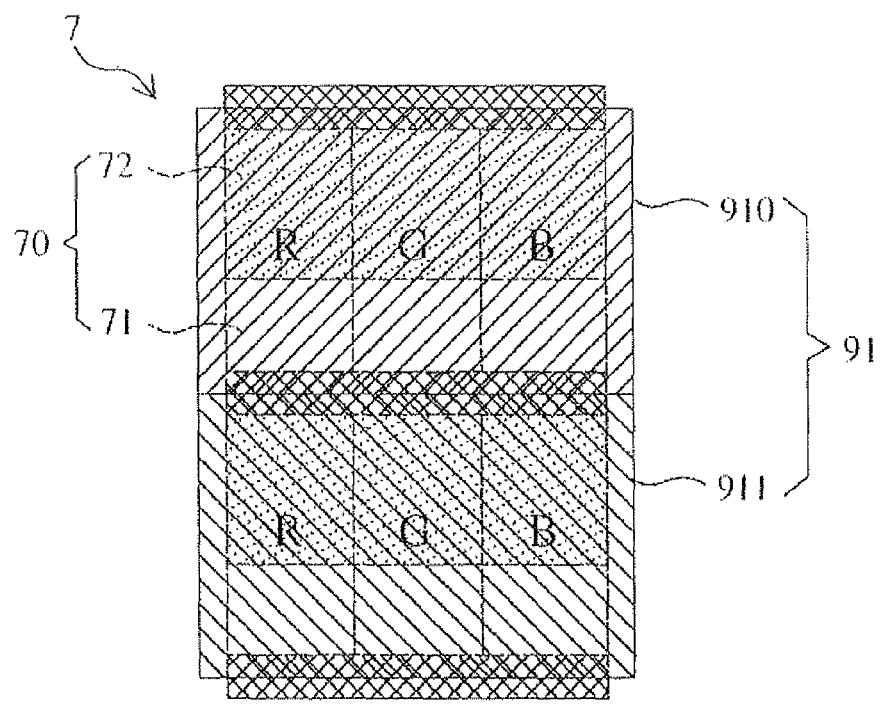
FIG. 2 is a partial schematic view of a phase retarder film mounted on a liquid crystal display panel of a conventional 3D display system.
Figure 3:
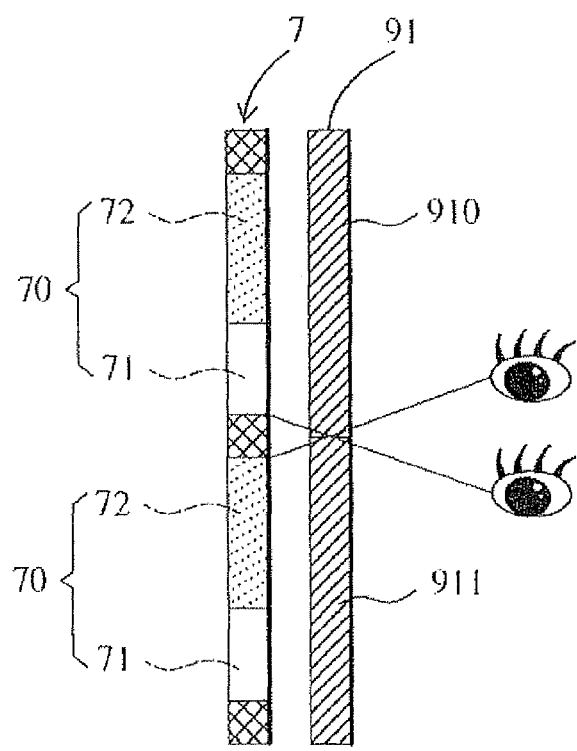
FIG. 3 is a side view of the structure in FIG. 2.
Figure 4:
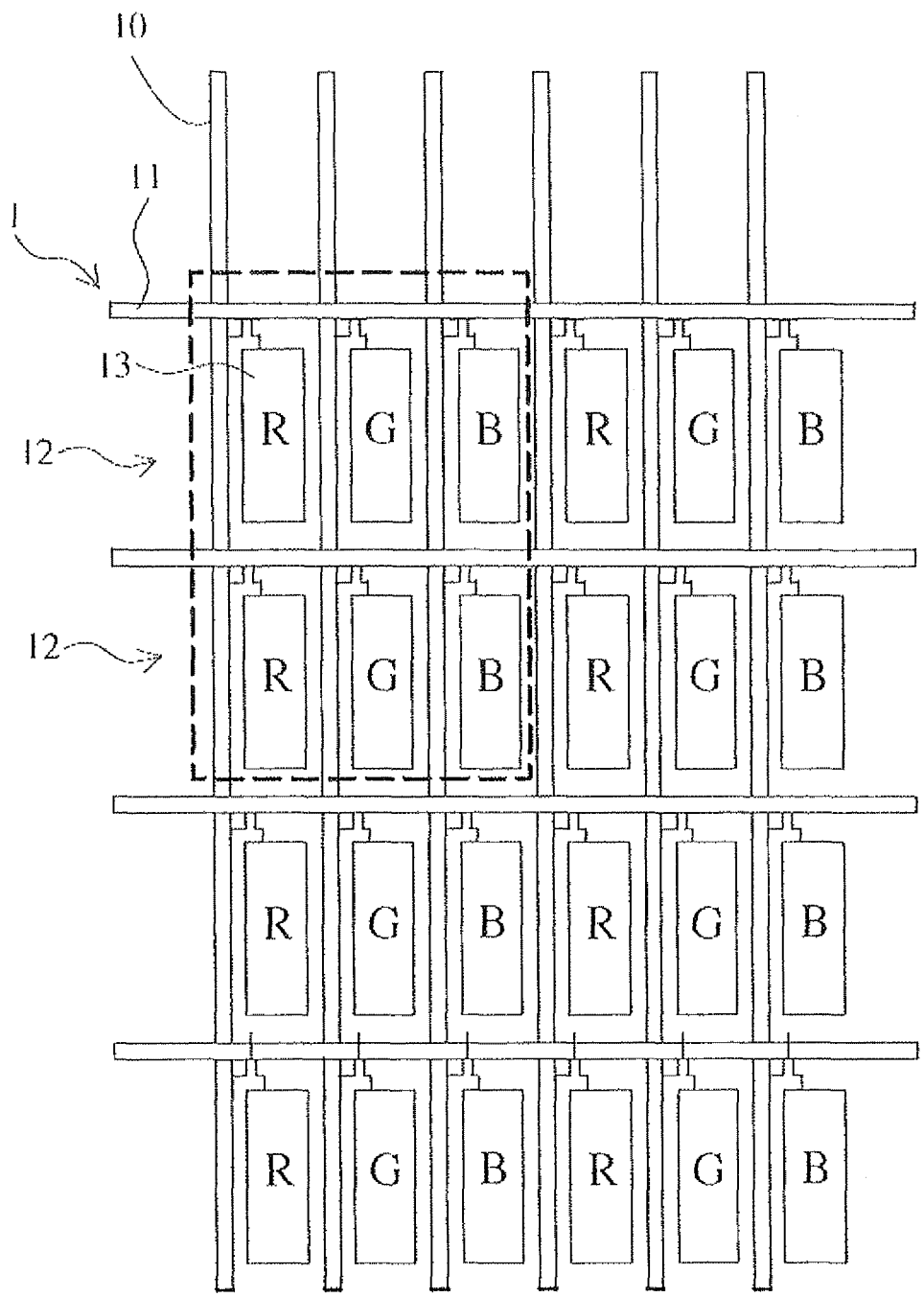
FIG. 4 is a schematic view of the pixel array of a liquid crystal display panel of a 3D display apparatus according to a preferred embodiment of the present invention.
Figure 5:
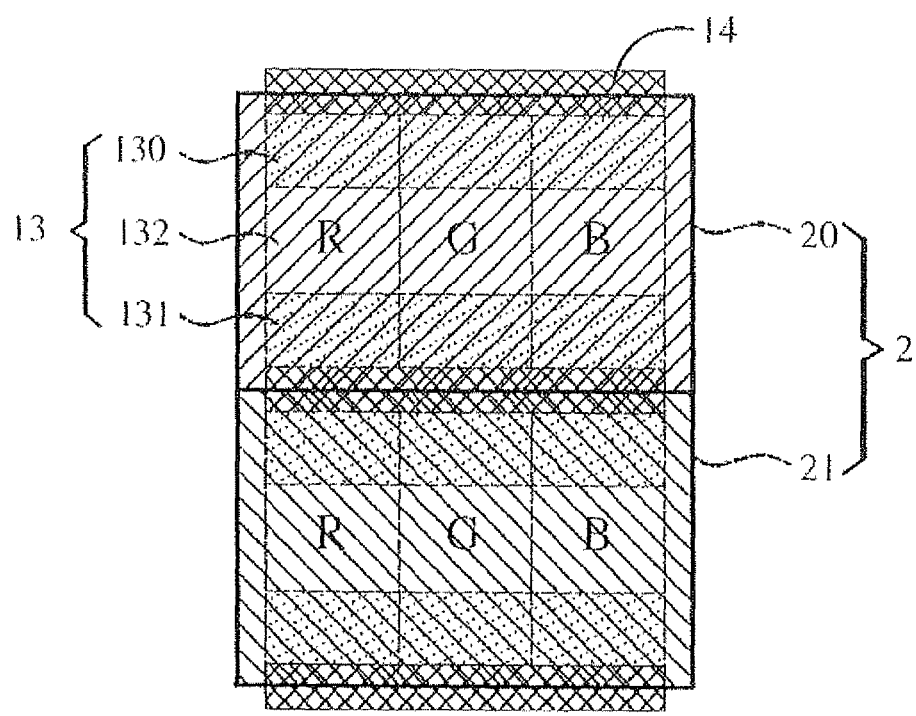
FIG. 5 is a partial schematic view of a phase retarder film mounted on the liquid crystal display panel of the 3D display apparatus according to the preferred embodiment of the present invention.
Figure 6:
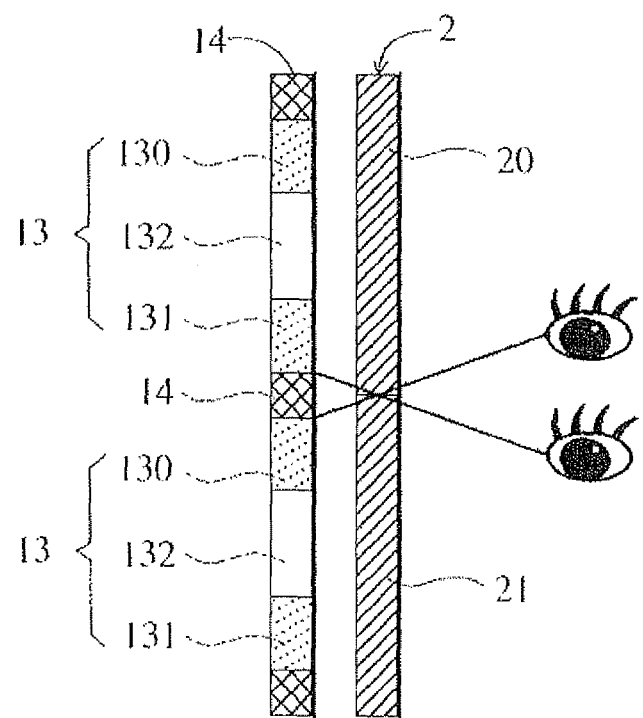
FIG. 6 is a side view of the structure in FIG. 5.

With reference to FIGS. 4 and 5, a 3D display apparatus in accordance to the present invention comprises a liquid crystal display panel and a phase retarder film 2. Generally speaking, the main structure of the liquid crystal display panel (not illustrated) may include a first substrate, a second substrate, a liquid crystal layer and two polarizers. The first substrate may be a glass substrate or a substrate made from other materials, which has a color filter mounted thereon. The color filter includes different kinds of photoresist units (usually red, green and blue). The second substrate of the liquid crystal display panel is mounted opposite the first substrate and has a plurality of gate lines 11, a plurality of data lines 10 and a pixel array 1 which are mounted on a surface of the second substrate. The liquid crystal layer is mounted between the first and the second substrates. The polarizers are mounted on the outside surface of the first substrate and the outside surface of the second substrate, respectively.

With reference to FIG. 4, the gate lines 11 are longitudinally arranged side by side at intervals side, and the data lines 10 are transversely arranged side by side at intervals and cross the gate lines 11 to form a plurality of pixel regions arranged in a matrix, also called pixel array 1. The pixel array 1 includes a plurality of pixel rows 12 longitudinally arranged side by side where each pixel row 12 is disposed between two adjacent gate lines 11. Furthermore, with reference to FIG. 5, a light shielding member 14 is disposed between each two adjacent pixel rows 12. In more details, the light shielding member 14 may be a part of the color filter, which position corresponds to the gap between each two adjacent pixel rows 12. In other words, the light shielding members 14 are parallel to the gate lines 11 and corresponding covers the gate lines 11. Each of the pixel rows 12 includes a plurality of sub-pixels 13 transversely arranged side by side, wherein in the same pixel row, three adjacent sub-pixels 13 may correspond to the positions of the foregoing photoresist units (red, green, blue) of the color filter, respectively, so as to form one pixel unit.

In the present invention, each of the sub-pixels 13 includes at least one major section and at least two minor sections, wherein the at least one minor section is disposed at a top of the sub-pixel 13, another minor section is disposed at a bottom of the sub-pixel 13, and the major section is disposed between the at least two minor sections. For example, with reference to FIG. 5, each of the sub-pixels 13 has a first minor section 130, a second minor section 131, and a major section 132. The first minor section 130, the major section 132 and the second minor section 131 are longitudinally arranged side by side, wherein the major section 132 is disposed between the first minor section 130 and the section minor section 131. In the embodiment, the first minor section 130, the second minor section 131 and the major section 132 of the sub-pixel 13 each have a rectangular shape; and the brightness of the first minor section 130 and the second minor section 131 is lower than that of the major section 132. In more details, in order to make the first minor section 130, the major section 132 and the section minor section 131 to have different brightness, the first minor section 130, the major section 132 and the second minor section 131 each have a pixel electrode section with the same shape, respectively (not shown in the drawings). The pixel electrode section is correspondingly connected to a switching unit, such as a thin-film transistor. The switching unit is connected to one of the gate lines 11 and one of the data lines 10. Therefore, by applying different driving voltages to the first minor section 130, the major section 132 and the second minor section 131, the brightness thereof can be changed. Thus, in order to make the major section 132 to have higher brightness, the driving voltage for the major section 130 is preferably greater that the driving voltages for the first minor section 130 and the second minor section 131. The driving voltage for the first minor section 130 is preferably equal to the driving voltage for the second minor section 131. In other possible embodiments, there may further be a third minor section mounted with intervals between the major section 132 and the first minor section 130; and there may further be a fourth minor section mounted with intervals between the major section 132 and the second minor section 131. The brightness of the third minor section ranges between the brightness of the major section and the brightness of the first minor section. The brightness of the fourth minor section ranges between the brightness of the major section and the brightness of the second minor section.

With reference to FIG. 5, the phase retarder film 2 is mounted on the liquid crystal display panel and overlapped with the pixel array 1. The phase retarder film 2 may be mounted on a surface of a polarizer at the light-exiting side of the liquid crystal display panel. The phase retarder film 2 includes a plurality of phase retarder units (20, 21) longitudinally arranged side by side, wherein the positions of the phase retarder units (20, 21) correspond to the positions of the pixel rows 12, respectively. In this embodiment, the phase retarder units (20, 21) of the phase retarder film 2 are divided into a plurality of first phase retarder units 20 and a plurality of second phase retarder units 21, wherein the first phase retarder units 20 and the second phase retarder units 21 are arranged alternately. In other words, the junction of the first phase retarder unit 20 and the second phase retarder unit 21 is between two adjacent pixel rows 12, and may be covered by the light shielding member 14 disposed between the adjacent pixel rows 12.

In this embodiment, the first phase retarder units 20 correspond to the odd-numbered pixel rows 12 in the pixel array 1; the second phase retarder units 21 correspond to the even-numbered pixel rows 12 in the pixel array 1. The phase retarder film 2 may be a quarter-wave array plate, wherein the first phase retarder units 20 each have a first optical axis, and the second phase retarder units 21 each have a second optical axis, wherein the angle between the optical axis of each first phase retarder unit 20 and the horizontal direction and the angle between the optical axis of each second phase retarder unit 21 are 45 degrees and 135 degrees, respectively.

The 3D display apparatus may further has a backlight module for providing a light source to the liquid crystal display panel.

The operation theory of the 3D display apparatus of the present invention is described as follow:

The polarizer of the liquid crystal display panel converts exiting lights outputted from the liquid crystal display panel into linearly polarized lights. The linearly polarized lights then travel through the phase retarder film 2, wherein the linearly polarized lights passing through the first phase retarder units 20 become left-handed circularly polarized lights (or right-handed circularly polarized lights); and the linearly polarized images passing through the second phase retarder units 21 become right-handed circularly polarized fights (or left-handed circularly polarized lights). A user can wear a pair of polarized glasses to receive the left-handed circularly polarized lights and the right-handed circularly polarized lights with his eyes, respectively, so as to generate three dimensional visual effects.

Figure 7:
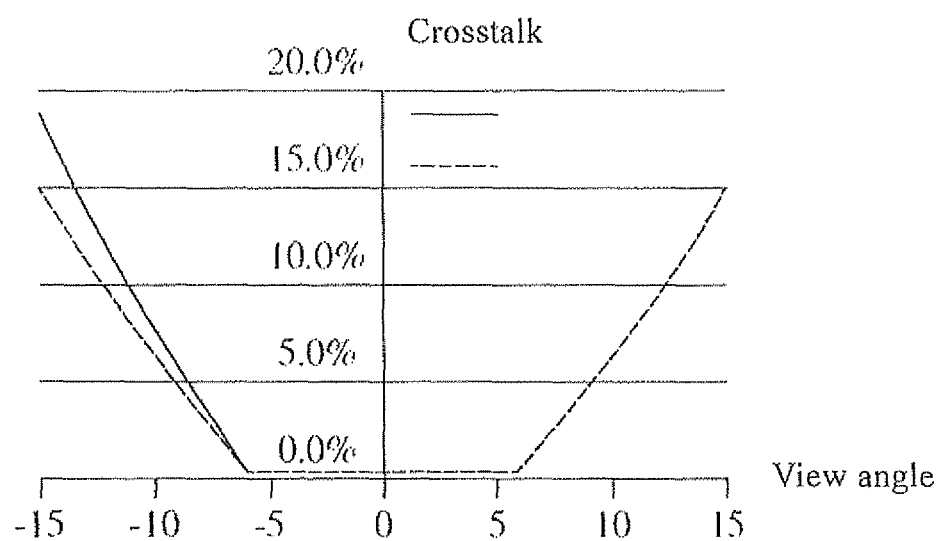
FIG. 7 is a curve graph showing the crosstalk at different viewing angles in the 3D display apparatus of the present invention.

Since the top and the bottom of each pixel row are provided with a bright less minor section (130, 131), no matter the display is viewed at a top view angle or a bottom view angle, the user can only see the light leakage of the minor section (130, 131) of the sub-pixel 13 of the adjacent pixel row 12, which is relatively darker. Therefore, with further reference to FIG. 7, crosstalk at symmetric positions at bottom view angle and top view angle can be at the same extent (dotted line). Compared with the more serious crosstalk at the bottom view angle in the conventional technologies (solid line), the crosstalk at the bottom view angle is enormously improved.

In other embodiments, each sub-pixel may include not only one major section, such as two major sections, as long as there are two less bright minor sections disposed at the top and the bottom of the sub-pixel that can achieve the effect of reducing the crosstalk at bottom view angles.

In conclusion, compared with the problem in the conventional technologies that the major section of a sub-pixel in the adjacent pixel row may have light leakage at a bottom view angle and thereby bringing more serious crosstalk, the present invention disposes the minor sections having lower brightness in the top side and bottom side of each sub-pixel of each pixel row, so that the same pixel row can maintain the same crosstalk level in symmetrical positions at top viewing angles and bottom view angles, to improve the shortcoming that to view the display apparatus at the bottom viewing angle has worse quality and thereby maintaining the uniformity of overall display qualities at top view angles and bottom view angles.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A 3D display apparatus comprising:
    a liquid crystal display panel having
    a pixel array having a plurality of pixel rows arranged side by side, wherein each pixel row includes a plurality of sub-pixels, and each sub-pixel consists of three single-piece, rectangular sections: a single-piece, rectangular first minor section, a single-piece, rectangular second minor section and a single-piece, rectangular major section, wherein the major section is disposed between the first minor section and the second minor section without additional, and the brightness value of each of the first minor section and the second minor section is lower than that of the major section; wherein the first minor section is disposed at a top side of the major section, and the second minor section is disposed at a bottom side of the major section and opposite to the first minor section; and
    a patterned retarder film mounted on the liquid crystal display panel and overlapped with the pixel array, and having a plurality of phase retarder units arranged side by side, wherein the positions of the phase retarder units of the patterned retarder film correspond to the positions of the pixel rows, respectively.

2. The 3D display apparatus as claimed in claim 1, wherein the pixel rows are longitudinally arranged side by side; the phase retarder units are longitudinally arranged side by side; the sub-pixels of each of the pixel rows are transversely arranged side by side; the first minor section, the major section and the second minor section of each of the sub-pixels are longitudinally arranged side by side.

3. The 3D display apparatus as claimed in claim 1, wherein a driving voltage applied to the major section is greater than a driving voltage applied to the first minor section, and is greater than a driving voltage applied to the second minor section.

4. The 3D display apparatus as claimed in claim 3, wherein the driving voltage applied to the first minor section is equal to the driving voltage applied to the second minor section.

5. The 3D display apparatus as claimed in claim 1, wherein a light shielding member is mounted between each two adjacent pixel rows.

6. The 3D display apparatus as claimed in claim 1, wherein the liquid crystal display panel includes a plurality of gate lines and a plurality of data lines, wherein the gate lines cross the data lines, and each of the pixel rows is disposed between each two adjacent gate lines.

7. The 3D display apparatus as claimed in claim 1, wherein the phase retarder units of the patterned retarder film are a plurality of first phase retarder units and a plurality of second phase retarder units, wherein the first retarder units and the second retarder units are arranged alternately.

8. The 3D display apparatus as claimed in claim 1, wherein the patterned retarder film is mounted on a surface of a polarizer at a light-exiting side of the liquid crystal display panel.

9. A pixel array structure comprising a plurality of pixel rows, wherein each pixel row has a plurality of sub-pixels, and each sub-pixel consists of three single-piece, rectangular sections: a single-piece, rectangular first minor section, a single-piece, rectangular second minor section and a single-piece, rectangular major section, wherein the major section is disposed between the first minor section and the second minor section, and the brightness value of each of the first minor section and the second minor section is lower than that of the major section; wherein the first minor section is disposed at a top side of the major section, and the second minor section is disposed at a bottom side of the major section and opposite to the first minor section.

10. The pixel array structure as claimed in claim 9, wherein the sub-pixels of each of the pixel rows are transversely arranged side by side; the first minor section, the major section and the second minor section of each of the sub-pixels are longitudinally arranged side by side.

* * * * *